United States Patent
Lindbom et al.

(10) Patent No.: US 6,798,853 B1
(45) Date of Patent: Sep. 28, 2004

(54) SYSTEM AND METHOD FOR COMPENSATING FOR FREQUENCY OFFSET

(75) Inventors: Lars Lindbom, Karlstad (SE); Kambiz Zangi, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 684 days.

(21) Appl. No.: 09/711,910

(22) Filed: Nov. 15, 2000

(51) Int. Cl.[7] ............................................... H04L 27/06
(52) U.S. Cl. .................. 375/344; 455/164.1; 455/192.2
(58) Field of Search ................................ 375/344, 371, 375/375; 455/75, 164.1, 164.2, 192.1, 192.2

(56) References Cited

U.S. PATENT DOCUMENTS

| | | | |
|---|---|---|---|
| 5,233,633 A | * 8/1993 | Baum et al. ................. | 375/344 |
| 5,732,111 A | 3/1998 | Walley | |
| 5,909,470 A | * 6/1999 | Barratt et al. ............... | 375/324 |
| 6,202,075 B1 | * 3/2001 | Azadet ....................... | 708/322 |

FOREIGN PATENT DOCUMENTS

| | | |
|---|---|---|
| EP | 0536687 | 4/1993 |
| EP | 1063826 | 12/2000 |

OTHER PUBLICATIONS

Patent Cooperation Treaty PCT International Search Report.
W. Lindsey and C. Chie, "A Survey of Digital Phase–Locked Loops," 69 Proc. IEEE 410–31 (Apr. 1981).
K.J. Molnar and G.E. Bottomley, "Adaptive Array Processing MLSE Receivers for TDMA Digital Cellular/PCS Communications," 16 IEEE J. Selected Areas in Comm. 1340–51 (Oct. 1998).

* cited by examiner

Primary Examiner—Stephen Chin
Assistant Examiner—Kevin Kim (57) ABSTRACT

The present invention is directed toward an automatic frequency control system for compensating for frequency offset of received data signals in a radio frequency communication system. A reference sample index for the data to be compensated is first determined as a function of the transmission channel and known training data. A scaled phase error estimate is calculated along with a time-varying filter parameter. From the scaled phase error estimate and the filter parameter, a frequency offset estimate and a phase drift estimate are calculated. The system proceeds through the time-indexed, received data signals until the entire received batch of data signals has been processed, and the corresponding compensated soft data has been output.

32 Claims, 4 Drawing Sheets

SYSTEM AND METHOD FOR COMPENSATING FOR FREQUENCY OFFSET

BACKGROUND

The present invention relates to systems for providing automatic frequency control in radio frequency communication systems and, more specifically, to a system for compensating for frequency offset in a digital mobile radio frequency communication system through automatic frequency control.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Digital communication systems, at their most basic level, provide for the transmission and reception of electronic messages between and among communication partners. The transmissions are effected through transmitters that modulate or encode the message and transmit the message in analog form for passage across a channel. At the receiver, the analog signal is converted back to the digital data of the message. Although paired transmitters and receivers are assigned to the same carrier, and the receiver is designed to perfectly demodulate (or decode) the modulated, transmitted signal, frequency offsets, or deviations, in the received signal may occur because of imperfections of oscillators and frequency synthesizers in the receiver. The frequency offset becomes, with time, a growing phase drift, which compromises the ability of the receiver to accurately and efficiently receive the transmitted messages. Therefore, in order to accurately detect sent information with minimal reception performance loss, the frequency offset of the received signal should be taken into consideration in the receiver design and compensated for during equalization.

Within the standards set for mobile radio frequency ("RF") communication systems, frequency offsets of up to several hundred hertz are allowed. For example, a system conforming to the Global System for Mobile Communication ("GSM") has a channel spacing of 200 KHz, thereby providing some tolerance for frequency offset without encountering the risk of receiving the wrong channel of transmitted data or receiving the transmitted data incorrectly. In contrast, however, a digital satellite communications system may use a channel spacing of only 5 KHz, with a correspondingly tight tolerance for frequency offset of received data.

In digital cellular telephones, automatic frequency control ("AFC") is commonly used in RF receivers to keep the receiver locked on a particular frequency, despite imperfect component stability that would otherwise result in frequency drift. In contemporary digital communication systems, AFC is commonly based on second order digital phase-locked loop ("PLL") filters that implement phase offset compensators to enable reliable communications. Such conventional AFC systems are used, for example, in current ANSI-136 systems, and effectively attempt to determine the phase error, to eliminate the phase drift. For a more thorough discussion of PLL filters and their use to determine phase error, see W. Lindsey and C. Chie, "A Survey of Digital Phase-Locked Loops," 69 Proc. IEEE 410-31 (April 1981); K. J. Molnar and G. E. Bottomley, "Adaptive Array Processing MLSE Receivers for TDMA Digital Cellular/PCS Communications," 16 IEEE J. Selected Areas in Comm. 1340-51 (October 1998).

More specifically, the impact of phase drift on an actual sampled, received data signal r(n) as a function of time index n=1, 2, 3, . . . , is commonly modeled as:

$$r(n)=e^{j\phi(n)}z(n)+v(n) \qquad (1)$$

where v(n) is additive noise from the transmission, and z(n) represents the desired signal, i.e., the signal carrying the transmitted data, and is represented by:

$$z(n) = \sum_{k=0}^{L-1} h(k)s(n-k), \qquad (2)$$

where h(k) is a set of channel estimates for the channel across which the signals have been transmitted and L is the number of taps for the channel, and where s(n−k) is the transmitted signal associated with the time index (n−k). $\phi(n)$ of equation (1) is the phase drift, given by:

$$\phi(n)=(n-n_0)\omega_0, \qquad (3)$$

with $\omega_0$ being the frequency offset and $n_0$ being the reference sample data index, defining the sample position where $\phi(n_0)=0$. More basically, the phase drift can be viewed as the frequency offset multiplied by time. This phase drift will be added, if uncorrected, to the phase of the desired signal, z(n). By estimating the phase drift as $\phi'(n)$, the received signal can be phase compensated as:

$$\hat{r}(n)=r(n)e^{-j\phi'(n)} \qquad (4)$$

If the estimate of the phase drift is close to $\phi(n)$, and if the signal-to-noise ratio is sufficiently high, then the resultant signal $\hat{r}(n)$ should be a good signal from which to detect the transmitted data. On the other hand, if nothing is done to compensate for errors in the estimates of the phase drift, the phase errors will degrade the ability of the receiver to determine the transmitted data. The detection of the sent data is thus based on phase-compensated data signals, with the aim of the AFC to provide accurate estimates of the phase drift. Conventional digital AFC systems provide this compensation as follows:

At each increment of the time index n, a phase error estimate is first calculated according to:

$$\phi_{error}(n)=arg(e^{j\phi'(n)}r^*(n)\hat{z}(n)) \qquad (5)$$

where arg( ) denotes phase, * denotes conjugation, $\hat{z}(n)$ denotes an estimate of the desired signal z(n), and $\phi'(n)$ is an estimate of the phase drift $\phi(n)$. Then, using the calculated phase error estimate, a new estimate of the frequency offset and a new estimate of the phase drift are determined by a second order filter according to:

$$\hat{\omega}_0(n+1)=\hat{\omega}_0(n)+K_1\phi_{error}(n) \qquad (6a)$$

$$\phi'(n+1)=\phi'(n)+\hat{\omega}_0(n+1)+K_2\phi_{error}(n) \qquad (6b)$$

in which $K_1$ and $K_2$ are two constant filter parameters, where $\hat{\omega}_0(n+1)$ denotes an updated estimate of the frequency offset $\omega_0$, and where. $\phi'(n+1)$ denotes an updated estimate of the phase drift. This scheme requires the estimation of the desired signal, or $\hat{z}(n)$. The choice of parameters $K_1$ and $K_2$ is a trade-off between fast convergence to the true frequency offset and sensitivity to noise. The parameters are set by prior simulations of data transmissions, using an upper estimate of the frequency offset, $\omega_0$, and an estimate of the anticipated noise, v(n). For example, when considering symbol spaced sampled received signals in a GSM system, typical values for $K_1$ and $K_2$ are less than 0.05 and 0.15, respectively.

Figure 1:
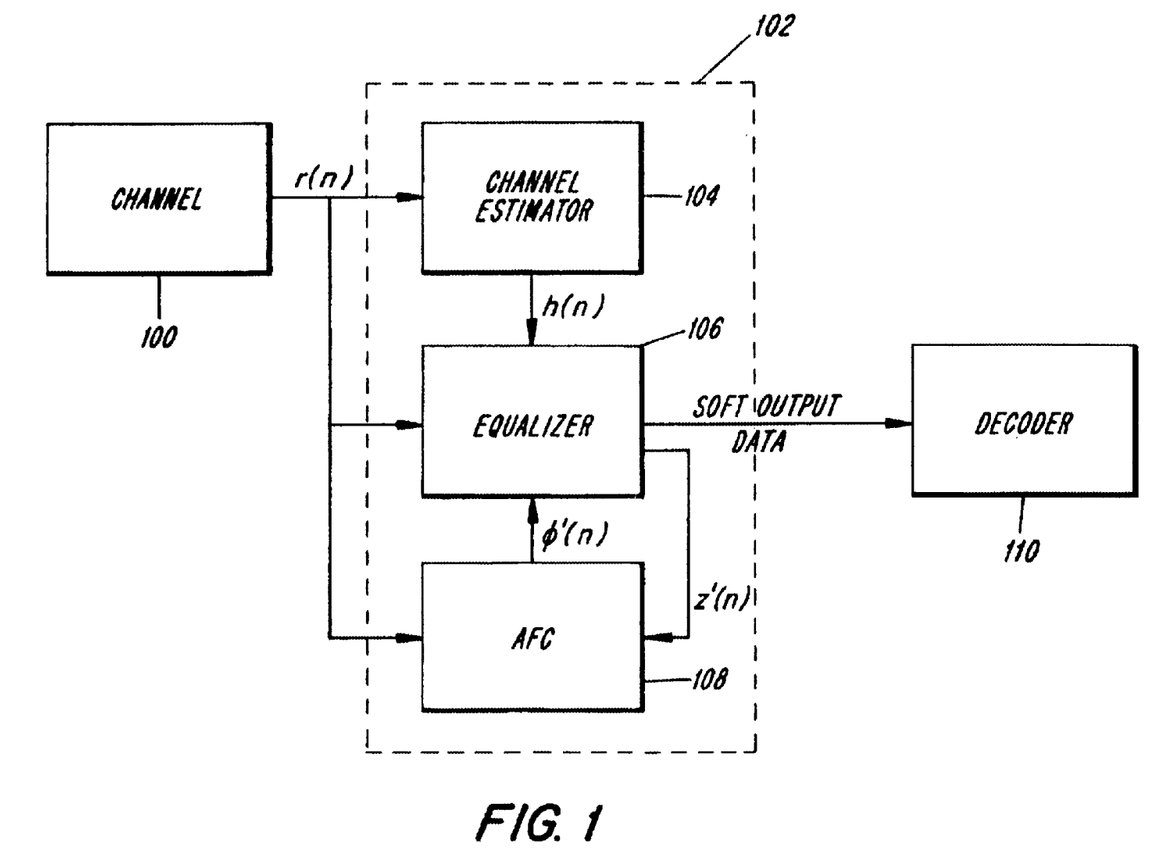
FIG. 1 is a block diagram of an example of an automatic frequency control system.
Figure 3A:
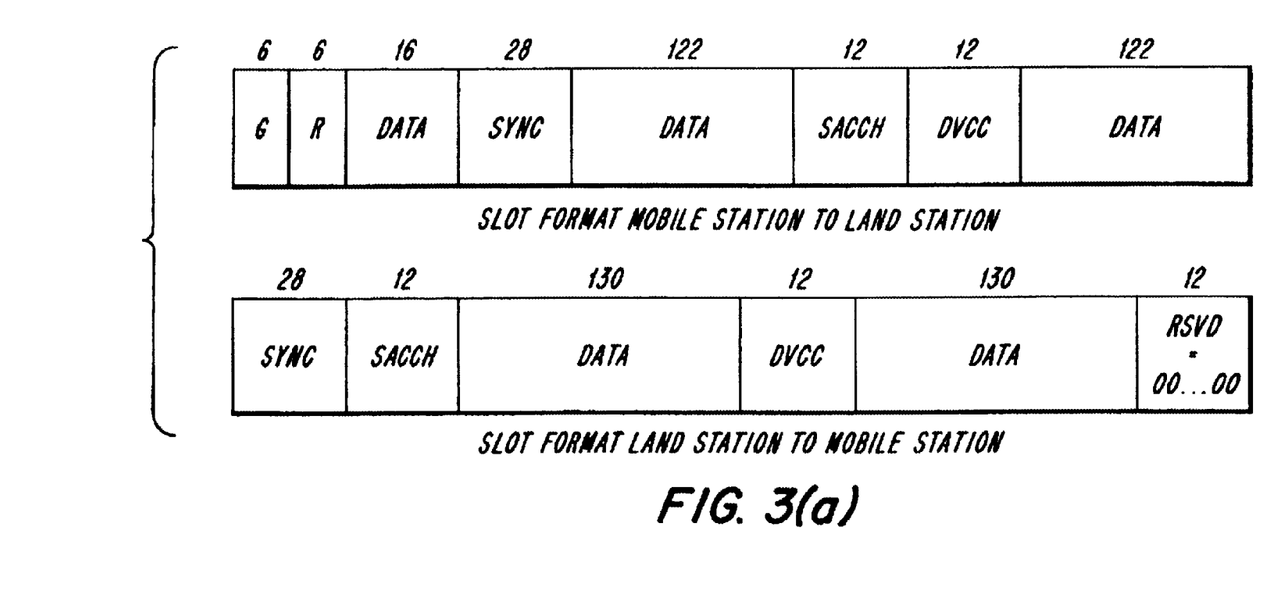
FIGS. 3(a) and 3(b) are diagrams of the layout of a batch of data bursts transmitted in exemplary ANSI-136 and GSM specified systems.
Figure 3B:
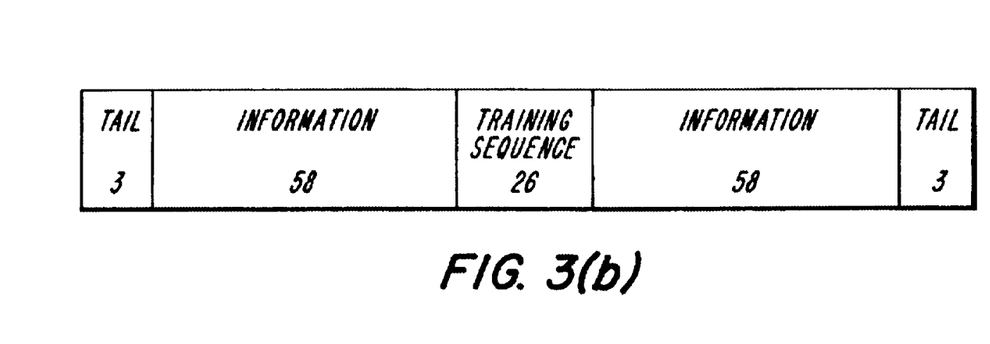

Referring now to FIG. 1, there is shown a block diagram of an example of an automatic frequency control system. A data signal, r(n), received across a Channel 100 is directed to a Detector 102 to determine the transmitted data. The Detector 102 includes, for example, a Channel Estimator 104, an Equalizer 106, and an AFC 108. The received data signal, r(n), is directed to the Channel Estimator 104, where values of h(k) (channel estimates) of equation (2) are determined by comparing the training sequence within each received burst of data against the known data sequence that corresponds thereto (see also FIG. 3b). The received data signal, r(n), is also directed to both the Equalizer 106 and the AFC 108. The Equalizer 106 produces the desired signal estimate, $\acute{z}$(n), for input into the AFC 108, and the soft output data, for input into the Decoder 110. The desired signal estimate, $\acute{z}$(n), is input to the AFC 108 for use in equation (5) above to produce the estimate of the phase drift, $\phi'$(n), through application of equation (6b). The phase drift $\phi'$(n) is, in turn, utilized in equation (4) to calculate the phase compensated signal, $\acute{r}$(n), in the Equalizer 106. In such a manner, the data signal, r(n), is phase corrected in the Equalizer 106 and used to generate the soft values, or data, for use by the Decoder 110. The iteration of data through the Detector 102 continues until the end of the received data batch, at which time the phase compensated received signal, $\acute{r}$(n), has been fully processed by the Equalizer 106 to produce soft output data for decoding by the Decoder 110 and for further processing as received data.

The problem with this conventional scheme is that if values of the constant filter coefficients $K_1$ and $K_2$ are set for fast convergence, the resulting phase estimate will not be very accurate. However, in the receiver it is desirable to provide a rapidly convergent phase estimate for accurate detection of the transmitted information. Accordingly, it would be desirable to provide an automatic frequency control system that quickly and reliably compensates for the frequency offset at the reception point for digital mobile radio communications.

The preferred embodiments of the present invention overcome the problems associated with existing mechanisms for providing automatic frequency control for RF receivers in digital communication systems.

SUMMARY

The present invention is directed toward a method and system for providing automatic frequency control (AFC) for received data in a mobile, radio frequency communication system. AFC systems and techniques according to the present invention provide automatic frequency control based on, among other things, a first order filtering process that employs a time variant coefficient.

According to an exemplary embodiment of the present invention, a reference sample index is selected as a function of the taps of the channel across which the data will be transmitted and the amount of training data with which the channel is estimated. The system then calculates an estimate of the desired, or transmitted, signal. Next, a scaled phase error estimate associated with the desired signal estimate is determined. The scaled phase error estimate is multiplied by a single order filter coefficient that varies as a function of time. The product of this multiplication is then added to a frequency offset estimate, thereby updating the frequency offset estimate. This process continues until the entire received batch of data signals has been processed. By calculating a scaled phase error estimate in this way, the present method and system for compensating for frequency offset provides rapid convergence without excessive amplification of the noise present in the received signal, thereby producing accurately compensated, received data.

The present inventive system differs from prior systems of automatic frequency control by employing a first order filtering process with a time variant scaling function that varies based on an estimate of the desired signal, instead of a second order filtering process that relies on constant scaling quantities. Thus, the present inventive AFC system has the advantage of being less complex than conventional AFC systems by utilizing only a single order filter and a single filter parameter, K. Also, the present invention provides better performance than conventional AFC's by ensuring a faster convergence for the frequency offset estimate, $\hat{\omega}_0$(n), and by ensuring that the variance of the estimation errors tends to zero as time goes to infinity. In addition, the present inventive system eliminates the need to explicitly compute the phase of the received signal, which is a computationally intensive task.

BRIEF DESCRIPTION OF THE DRAWINGS

These and other objects and advantages of the present invention will become more apparent and more readily appreciated from the following description of the preferred embodiments, taken in conjunction with the accompanying drawings, of which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are based upon the time division multiple access ("TDMA") protocol, in which communication between the base station and the mobile terminals is performed over a number of time slots. However, those skilled in the art will appreciate that the concepts disclosed herein find use in other protocols, including, but not limited to, frequency division multiple access ("FDMA"), code division multiple access ("CDMA"), or some hybrid of any of the above protocols. Likewise, some of the exemplary embodiments provide illustrative examples relating to the GSM or ANSI-136 type of systems; however, the techniques described herein are equally applicable to radio communication systems operating in accordance with any specification.

Figure 2:
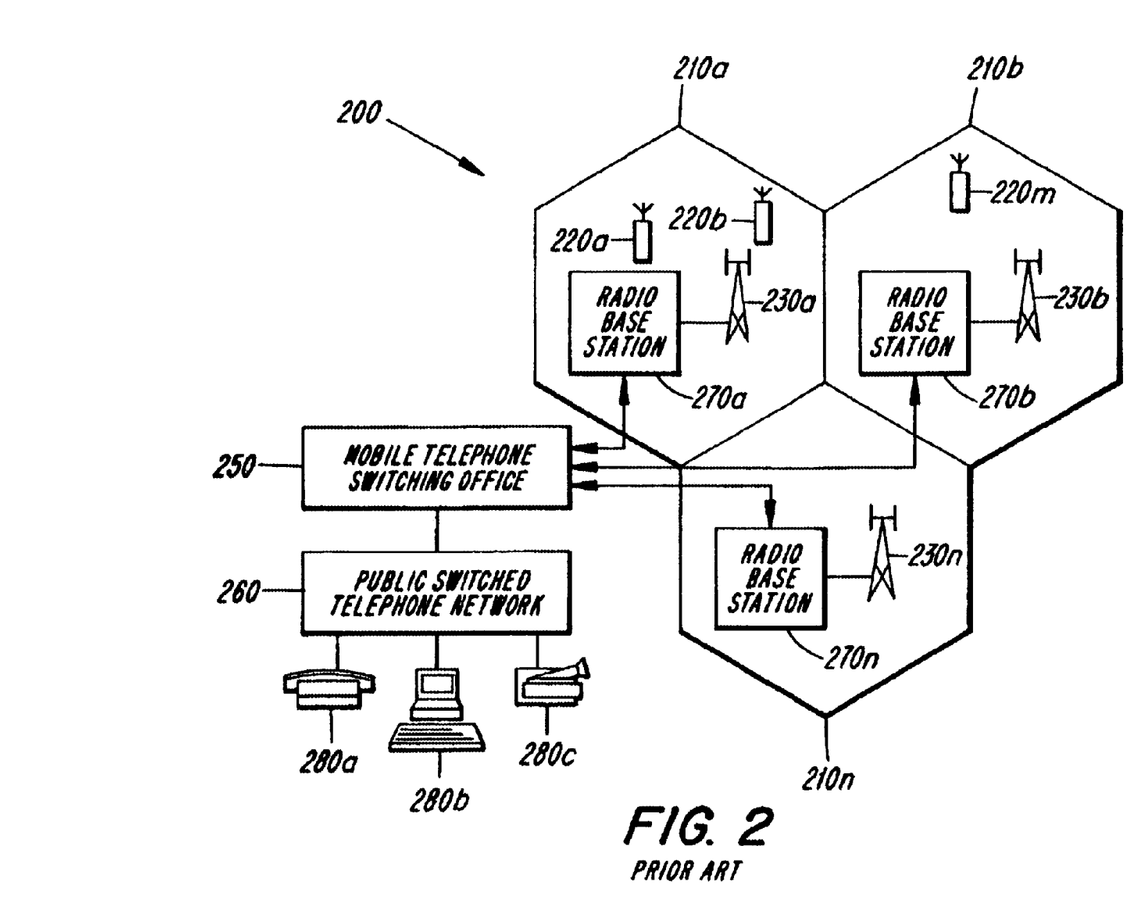
FIG. 2 is a block diagram of a conventional radio frequency communication system.

Prior to discussing exemplary AFC embodiments according to the present invention, FIG. 2 will now be described which illustrates a general radio communication system 200 in which the present invention can be implemented. The radio communication system 200 includes a plurality of radio base stations 270a–n connected to a plurality of corresponding antennas 230a–n. The radio base stations 270a–n in conjunction with the antennas 230a–n communicate with a plurality of mobile terminals (e.g. terminals 220a, 220b, and 220m) within a plurality of cells 210a–n. Communication from a base station to a mobile terminal is referred to as the downlink, whereas communication from a mobile terminal to the base station is referred to as the uplink.

The base stations are connected to a mobile telephone switching office ("MSC") 250. Among other tasks, the MSC coordinates the activities of the base stations, such as during the handoff of a mobile terminal from one cell to another. The MSC, in turn, can be connected to a public switched telephone network 260, which services various communication devices 280a, 280b, and 280c. Both the mobile terminals, 220a, 220b, and 220m, and the base stations 270a–n can incorporate AFC structures and techniques according to the present invention.

According to exemplary embodiments of the present invention, AFC can be implemented using a first order automatic frequency control filter, with a time-varying filter parameter. The AFC of the present invention begins with an initialization of the reference sample index $n_0$ (an integer). In the conventional AFC system described above, as exemplified by equation (3), $n_0$ is the selected sample data offset index at which the phase drift, $\phi(n)$, is assumed to be zero. According to exemplary embodiments of the present invention, the reference sample index $n_0$ is initialized to be L−1+(N−L)/2 samples to the right of the first training data sample for a channel of L taps being estimated over a sequence of N symbols of training data. This equation for establishing the reference sample index ensures that the index $n_0$ is set within the transmitted training data batch for a given channel protocol and that $\phi(n_0)$ is zero, or close to zero. As will be recognized by those skilled in the art, the number of channel taps employed by a receiver is associated with the amount of time dispersion encompassed by the channel model. For example, the number of taps, or L, employed in exemplary ANSI-136 receivers is 2. The number of taps for GSM communication system receivers generally ranges from 3 to 8 but is most typically 5 or 6. The number of symbols, N, in the training sequences is predefined by the applicable standard. For example, bursts in ANSI-136 specified systems have 14 symbols in each training sequence (i.e., the SYNC field in the burst format of FIG. 3(a) with two bits per symbol), whereas N is 26 for bursts transmitted in GSM-specified systems (see, e.g., FIG. 3(b)). The above equation for establishing $n_0$ as a starting point recognizes that the transmitted data burst commences with L terms, followed by a sequence of N training data symbols; and, therefore, the starting point for the iteration of the present invention begins within the received training data.

The offset sample index, $\acute{n}$, of the present invention is defined as:

$$\acute{n} = n - n_0 \tag{7}$$

At each iteration, a scaled phase error estimate is then determined as:

$$\psi_{error}(n) = \text{Imag}\{e^{-j\phi'(n)}r(n)\hat{z}^*(n)\} \tag{8}$$

Next, a first order, time-varying filter parameter, K(n), is determined as a function of the scalar P:

$$P = P/(1+\acute{n}^2 P|\hat{z}(n)|^2) \tag{9a}$$

$$K(n) = \acute{n}P \tag{9b}$$

The parameter P is a measure of the variance of the frequency offset estimate, $\hat{\omega}_0(n)$, as is discussed more thoroughly below. As can be seen from the equation (9a), the denominator will always be larger than one; and, therefore, the variance will approach zero as n approaches infinity.

Next, the frequency offset estimate is updated according to:

$$\hat{\omega}_0(n+1) = \hat{\omega}_0(n) + K(n)\psi_{error}(n), \tag{10a}$$

where $\hat{\omega}_0(n+1)$ denotes the updated estimate of the frequency offset, $\omega_0$.

Finally, following the updating of the frequency offset estimate, the phase drift estimate is updated as:

$$\phi'(n+1) = (\acute{n}+1)\hat{\omega}_0(n+1), \tag{10b}$$

with $\phi'(n+1)$ representing the estimate of the phase drift, $\phi(n+1)$. The sample index n is incremented as n=n+1, and the system branches back to equation (7) to reexecute equations (7)–(10b) until all data signals r(n) in the received batch have been processed.

The initial value, $\hat{\omega}_0(0)$, for the frequency offset estimate, is established based on prior knowledge regarding the frequency offset, $\omega_0$. If no prior information is available, this initial value is typically set to zero. The initial value for P is set based on the confidence of the prior knowledge regarding the frequency offset. For example, a relatively large initial value for P indicates that the initial guess for $\hat{\omega}_0(0)$ may deviate substantially from the true frequency offset associated with the received signal r(n). On the other hand, a small initial value for P indicates that the estimate, $\hat{\omega}_0(0)$, for the frequency offset is quite close.

As can be seen from the equation (9a), the parameter P will be multiplied by $|\hat{z}(n)|^2$, which indicates that the initial P has to be normalized with respect to the signal power. For example, P can be normalized with the variance, Var(z), of the desired signal, such that the initial value for P, multiplied by Var(z), equals a constant, $P_0$. For example, when considering symbol spaced sampled received signals in an EDGE system, the constant, $P_0$, is typically much less than 1.0. This variance, Var(z), can, for example, be determined from the training data; or, for digital mobile systems which operate at rather high signal-to-noise ratios, the variance can be replaced by the power of the received signal, r(n).

Figure 4:
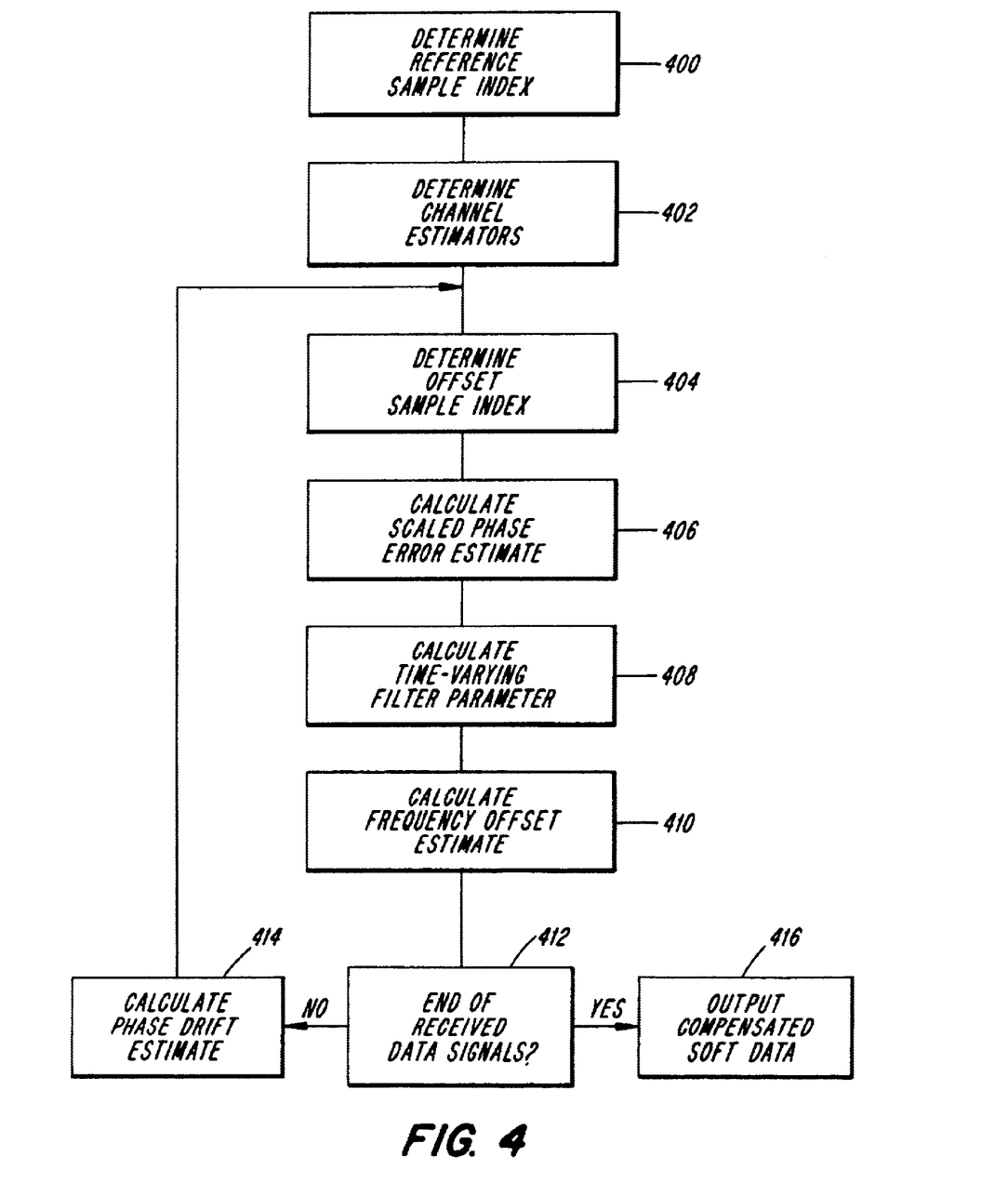
FIG. 4 is a block diagram of the method of providing automatic frequency control to compensate for frequency offset according to an embodiment of the invention.

Referring now to FIGS. 1 and 4, there are shown block diagrams of the apparatus and the process, respectively, of an embodiment of the automatic frequency control system of the present invention. As a preliminary process, at step 400 the reference sample index is calculated, based on the channel over which the data signals r(n) will be transmitted. FIG. 1 shows a received data signal, r(n), being directed to a Detector 102 to determine the received data. The Detector 102 in the present invention includes, for example, a Channel Estimator 104, an Equalizer 106, and an AFC 108. The received data signal, r(n), is directed to the Channel Estimator 104, where values of h(k) (channel estimates) of equation (2) are determined at step 402 by comparing the training sequence within each received burst of data against the known data sequence that corresponds thereto (see also FIG. 3b). The received data signal, r(n), is also directed to both the Equalizer 106 and the AFC 108. At step 404, the Equalizer 106 determines the offset sample index, ñ, and also outputs the desired signal estimate, ẑ(n) to the AFC 108, which processes steps 406–414 as shown in FIG. 4. At step 406, the AFC 108 utilizes the received data signal, r(n) and the desired signal estimate, ẑ(n), to calculate the scaled phase error estimate, $\psi_{error}(n)$, in equation (8). At step 408, the time-varying scalar filter parameter is calculated. The frequency offset estimate, $\hat{\omega}_0(n)$, is calculated at step 410, and the system checks at step 412 whether the received data burst has been completely processed. If the last of the received batch of data signals r(n) have been processed, the received data is output from the Equalizer 106 at step 416 as soft output data, to be passed to the Decoder 110 for decoding and further processing as accurately received data. Otherwise, the system calculates the phase drift estimate φ'(n), of equation (10b) at step 414 and returns to step 404 to continue processing the received data signals.

The present inventive system differs from prior systems of automatic frequency control by employing a first order filtering process with a time variant coefficient that varies based on an estimate of the desired signal, instead of a second order filtering process that relies on constant scaling quantities. Thus, the present inventive AFC system has the advantage of being less complex than conventional AFC systems by utilizing only a single order filter and a single filter parameter, K. Also, the present invention has better performance than conventional AFC's by ensuring a faster convergence for the estimated frequency offset, $\omega_0(n)$, in order to produce the compensated soft output data. In addition, the present inventive system eliminates the computationally intensive task of calculating the phase of complex-valued numbers as required in equation (5) of a conventional AFC.

The present inventive system and method of providing automatic frequency control can be extended to multi-branch radio frequency communication systems wherein the signal r(n) is received with multiple antennas, and therefore via different communication paths. The result of such a system is multiple r(n) signals. The scalars disclosed above, such as r(n) and ẑ(n), will now be column vectors of dimension M×1, and the above calculations would proceed employing known matrix multiplication processing. For example, the corresponding equations above would include a hermitian weighting matrix, W, of dimension M×M, as shown below for equations (8) and (9a).

$$\psi_{error}(n)=\text{Imag}\{e^{-j\phi'(n)}\hat{z}^*(n)Wr(n)\} \quad (8')$$

$$P=P/(1+\hat{n}^2 P\hat{z}^*(n)W\hat{z}(n)) \quad (9a')$$

In this manner, the present invention can provide AFC processing for the multiple, received branch signals that comprise a single signal that has been transmitted across multiple paths.

The present invention can also be implemented in communication devices that include fractional spaced receiver design. In fractional spaced systems and terminals, a detector uses received sampled data in which the sampling rate is a multiple, U, of the symbol rate. For example, consider a received signal, r(n), that has been sampled at the sampling instants n=1, 2, 3, 4, . . . , with the multiple, U=2. This signal can be regarded as two symbol space sampled signals, $r_1(n)$ and $r_2(n)$, by associating the odd samples, r(1), r(3), . . . , with $r_1(n)$; and even samples r(2), r(4), . . . with $r_2(n)$, in which n=1, 2, 3, 4, . . . . By associating $r_1(n)=r(2n-1)$ and $r_2(n)=r(2n)$, the received signal, r(n), can be represented as a vector of two elements, yielding two branches, according to:

$$r(n) = \begin{bmatrix} r_1(n) \\ r_2(n) \end{bmatrix} \quad (11)$$

The multi-branch equations (8') and (9a') are thus also applicable for fractional spaced sampled systems and terminals. When considering receiver structures with, for example, D antennas and fractional space sampling in general, the number of branches will be D multiplied by U.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method for providing automatic frequency control in a radio communication device, comprising the steps of:

calculating an estimate of a desired signal;

determining a scaled phase error estimate associated with said estimate of said desired signal;

multiplying said scaled phase error estimate by a time-varying coefficient; and adding the product of said multiplying step to a frequency offset estimate.

2. The method of claim 1, wherein the step of calculating said estimate of said desired signal further comprises the step of calculating said desired signal as:

$$z(n) = \sum_{k=0}^{L-1} h(k)s(n-k),$$

wherein h(k) is a set of channel estimates and L is the number of taps for said channel, and where s(n−k) is the transmitted signal associated with the time index (n−k).

3. The method of claim 1, wherein the step of determining said scaled phase error estimate further comprises the step of calculating an estimate of the phase drift of said desired signal.

4. The method of claim 3, wherein the step of determining said scaled phase error estimate further comprises calculating:

$$\psi_{error}(n)=\text{Imag}\{e^{-j\phi'(n)}r(n)\hat{z}^*(n)\}$$

wherein φ'(n) is the estimate of the phase drift of said desired signal, ẑ(n) is said estimate of said desired signal, and r(n) is a received data signal as a function of a time index.

5. The method of claim 1, wherein the step of multiplying said scaled phase error estimate further comprises calculating:

$$P=P/(1+\hat{n}^2 P|\hat{z}(n)|^2),$$

wherein P is a measure of a variance of a frequency offset estimate, ñ is an offset sample index, and ẑ(n) is said estimate of said desired signal.

6. The method of claim 1, wherein the step of multiplying said scaled phase error estimate further comprises calculating:

$$K(n)=\acute{n}P,$$

wherein P is a measure of a variance of a frequency offset estimate, and ń is an offset sample index.

7. The method of claim 1, wherein the step of adding the product of said multiplying step further comprises calculating an updated frequency offset estimate according to:

$$\hat{\omega}_0(n+1)=\hat{\omega}_0(n)+K(n)\psi_{error}(n),$$

wherein K(n) is said time-varying coefficient, $\psi_{error}(n)$ is said scaled phase error estimate, and $\hat{\omega}_0(n)$ is said frequency offset estimate.

8. The method of claim 1, further comprising the steps of:
   (a) incrementing a sample index; and
   (b) calculating said scaled phase error estimate using said sample index.

9. The method of claim 8, wherein said sample index is initialized according to the equation:

$$n_0=L-1+(N-L)/2,$$

wherein L represents the number of taps employed in the channel utilized by said radio communication device, and N represents the number of symbols in each sequence of training data received across said communication channel.

10. The method of claim 7, further comprising the step of:
   estimating a phase drift based on said frequency offset estimate.

11. The method of claim 10, wherein said phase drift is estimated according to the equation:

$$\phi'(n+1)=(\acute{n}+1)\hat{\omega}_0(n+1),$$

wherein n is a sample index, and ń is an offset sample index.

12. An apparatus for providing automatic frequency control in a radio communication device, comprising:
   a first estimator unit calculating an estimate of a desired signal;
   a second estimator unit determining a scaled phase error estimate associated with said estimate of said desired signal;
   a multiplier unit multiplying said scaled phase error estimate by a time-varying coefficient; and
   a first adding unit adding the product of said multiplier unit to a frequency offset estimate.

13. The apparatus of claim 12, wherein the first estimator unit further calculates said desired signal as:

$$z(n) = \sum_{k=0}^{L-1} h(k)s(n-k),$$

wherein h(k) is a set of channel estimates and L is the number of taps for said channel, and where s(n−k) is the transmitted signal associated with the time index (n−k).

14. The apparatus of claim 12, wherein the second estimator further determines an estimate of the phase drift of said desired signal.

15. The apparatus of claim 14, wherein the second estimator determines said scaled phase error estimate according to the equation:

$$\psi_{error}(n)=\text{Imag}\{e^{-j\phi'(n)}r(n)\hat{z}^*(n)\}$$

wherein $\phi'(n)$ is the estimate of the phase drift of said desired signal, $\hat{z}(n)$ is said estimate of said desired signal, and r(n) is a received data signal as a function of a time index.

16. The apparatus of claim 12, wherein said multiplier unit further calculates:

$$P=P/(1+\acute{n}^2P|\hat{z}(n)|^2),$$

wherein P is a measure of a variance of a frequency offset estimate, ń is an offset sample index, and $\hat{z}(n)$ is said estimate of said desired signal.

17. The apparatus of claim 12, wherein said multiplier further calculates:

$$K(n)=\acute{n}P,$$

wherein ń is an offset sample index, and P is a measure of a variance of a frequency offset estimate.

18. The apparatus of claim 12, wherein said first adding unit updates said frequency offset estimate according to the equation:

$$\hat{\omega}_0(n+1)=\hat{\omega}_0(n)+K(n)\psi_{error}(n),$$

wherein K(n) is said time-varying coefficient, $\psi_{error}(n)$ is said scaled phase error estimate, and $\hat{\omega}_0(n)$ is said frequency offset estimate.

19. The apparatus of claim 12, further comprising:
   (a) a second adding unit incrementing a sample index; and
   (b) a third estimating unit calculating said scaled phase error estimate using said sample index.

20. The apparatus of claim 19, wherein said sample index is initialized according to the equation:

$$n_0=L-1+(N-L)/2,$$

wherein L represents the number of taps employed in the channel utilized by said radio communication device, and N represents the number of symbols in each sequence of training data received across said communication channel.

21. The apparatus of claim 19, further comprising:
   a fourth estimating unit estimating a phase drift based on said frequency offset estimate.

22. The apparatus of claim 21, wherein said phase drift is estimated according to the equation:

$$\phi'(n+1)=(\acute{n}+1)\hat{\omega}_0(n+1),$$

wherein n is a sample index, and ń is an offset sample index.

23. A method for providing automatic frequency control, comprising the steps of:
   updating a frequency offset estimate using a first order filter having a time varying weighting function that varies as a function of an estimate of a desired signal wherein the step of updating a frequency offset estimate further comprises calculating:

$$\hat{\omega}_0(n+1)=\hat{\omega}_0(n)+K(n)\psi_{error}(n),$$

wherein K(n) is said time varying weighting function, $\psi_{error}(n)$ is a scaled phase error estimate, and $\hat{\omega}_0(n)$ is said frequency offset estimate.

24. The method of claim 23, further comprising the step of calculating:

$$P=P/(1+\acute{n}^2P|\hat{z}(n)|^2),$$

wherein P is a measure of a variance of a frequency offset estimate, ń is an offset sample index, and $\hat{z}(n)$ is said estimate of said desired signal.

25. The method of claim 23, further comprising the step of calculating:

$$K(n) = \hat{n}P,$$

wherein $\hat{n}$ is an offset sample index, and P is a measure of a variance of a frequency offset estimate.

26. The method of claim 23, wherein said desired signal is represented by:

$$z(n) = \sum_{k=0}^{L-1} h(k)s(n-k),$$

wherein h(k) is a set of channel estimates and L is the number of taps for said channel, and where s(n−k) is the transmitted signal associated with the time index (n−k).

27. The method of claim 23, further comprising calculating said scaled phase error estimate according to the equation:

$$\psi_{error}(n) = \text{Imag}\{e^{-j\phi'(n)}r(n)\hat{z}^*(n)\}$$

wherein $\phi'(n)$ is an estimate of the phase drift of said desired signal, $\hat{z}(n)$ is said estimate of said desired signal, and r(n) is a received data signal as a function of a time index.

28. An apparatus for providing automatic frequency control, comprising:

a processor updating a frequency offset estimate using a first order filter having a time varying weighting function that varies as a function of an estimate of a desired signal wherein said processor updates said frequency offset estimate according to the equation:

$$\hat{\omega}_0(n+1) = \hat{\omega}_0(n) + K(n)\psi_{error}(n),$$

wherein K(n) is said time varying weighting function, $\psi_{error}(n)$ is a scaled phase error estimate, and $\hat{\omega}_0(n)$ is said frequency offset estimate.

29. The apparatus of claim 28, wherein said processor further calculates:

$$P = P/(1 + \hat{n}^2 P|\hat{z}(n)|^2),$$

wherein P is a measure of a variance of a frequency offset estimate, $\hat{n}$ is an offset sample index, and $\hat{z}(n)$ is said estimate of said desired signal.

30. The apparatus of claim 28, wherein said processor further calculates:

$$K(n) = \hat{n}P,$$

wherein $\hat{n}$ is an offset sample index, and P is a measure of a variance of a frequency offset estimate.

31. The apparatus of claim 28, wherein said desired signal is represented by:

$$z(n) = \sum_{k=0}^{L-1} h(k)s(n-k),$$

wherein h(k) is a set of channel estimates and L is the number of taps for said channel, and where s(n−k) is the transmitted signal associated with the time index (n−k).

32. The apparatus of claim 28, wherein said processor updates said frequency offset estimate by first calculating said scaled phase error estimate according to the equation:

$$\psi_{error}(n) = \text{Imag}\{e^{-j\phi'(n)}r(n)\hat{z}^*(n)\},$$

wherein $\phi'(n)$ is an estimate of the phase drift of said desired signal, $\hat{z}(n)$ is said estimate of said desired signal, and r(n) is a received data signal as a function of a time index.

* * * * *